(12) United States Patent
Meitinger et al.

(10) Patent No.: US 8,746,713 B2
(45) Date of Patent: Jun. 10, 2014

(54) WHEEL SUSPENSION FOR MOTOR VEHICLES

(75) Inventors: Karl-Heinz Meitinger, München (DE); Armin Ohletz, Kösching (DE); Walter Schmidt, Rennertshofen (DE)

(73) Assignee: Audi AG, Ingolstadt (DE)

( * ) Notice: Subject to any disclaimer, the term of this patent is extended or adjusted under 35 U.S.C. 154(b) by 75 days.

(21) Appl. No.: 13/504,832

(22) PCT Filed: Oct. 13, 2010

(86) PCT No.: PCT/EP2010/006256
§ 371 (c)(1),
(2), (4) Date: Jul. 12, 2012

(87) PCT Pub. No.: WO2011/050911
PCT Pub. Date: May 5, 2011

(65) Prior Publication Data
US 2012/0280465 A1   Nov. 8, 2012

(30) Foreign Application Priority Data
Oct. 30, 2009   (DE) .................... 10 2009 051 468

(51) Int. Cl.
*B60G 17/00* (2006.01)

(52) U.S. Cl.
USPC ................................................. 280/86.751

(58) Field of Classification Search
USPC ............. 280/86.75, 86.751, 86.757, 124.109, 280/124.134, 124.135, 124.137, 124.149, 280/124.152, 124.166
See application file for complete search history.

(56) References Cited

U.S. PATENT DOCUMENTS

| | | | |
|---|---|---|---|
| 4,736,964 A * | 4/1988 | Specktor | .................... 280/86.75 |
| 5,074,581 A | 12/1991 | Matsuoka | |
| 5,536,035 A | 7/1996 | Bautz et al. | |
| 5,538,274 A * | 7/1996 | Schmitz et al. | ........ 280/124.142 |
| 2002/0190492 A1 | 12/2002 | Strong | |
| 2005/0051990 A1 | 3/2005 | Pond | |
| 2005/0134015 A1* | 6/2005 | Ziech et al. | ............ 280/124.109 |
| 2005/0151337 A1 | 7/2005 | Chalin et al. | |
| 2008/0042391 A1 | 2/2008 | Holland et al. | |

FOREIGN PATENT DOCUMENTS

| | | |
|---|---|---|
| DE | 36 06 961 A1 | 9/1987 |
| DE | 37 34 287 A1 | 4/1989 |
| DE | 40 15 777 A1 | 11/1990 |
| DE | 36 35 612 C2 | 6/1993 |
| DE | 197 03 504 B4 | 10/1997 |
| DE | 199 15 214 A1 | 10/2000 |
| DE | 100 36 396 A1 | 2/2002 |

(Continued)

*Primary Examiner* — Paul N Dickson
*Assistant Examiner* — Robert A Coker
(74) *Attorney, Agent, or Firm* — Henry M. Feiereisen LLC

(57) ABSTRACT

A wheel suspension for motor vehicles includes at least one wheel guide element which is articulated both on an auxiliary frame that can be connected to the body of the motor vehicle and on a wheel carrier, a suspension and damping system as well as a steering system for the wheel. To achieve a universally applicable wheel suspension using identical parts, the auxiliary frame for each wheel suspension is designed as an independent modular frame, on which the a wheel guide element(s) is/are articulated, on which the suspension and damping system is supported, and on which at least one actuator is arranged directly or indirectly for actuating the suspension and damping system and/or the steering system and thus for setting predetermined wheel-specific wheel guidance and/or steering parameters.

24 Claims, 5 Drawing Sheets

(56) References Cited

FOREIGN PATENT DOCUMENTS

| DE | 10 2004 001727 A1 | 8/2005 |
| DE | 10 2004 022 167 A1 | 12/2005 |
| DE | 10 2005 026 047 A1 | 12/2006 |
| EP | 0 802 075 A2 | 10/1997 |
| IE | 20 040 230 A1 | 12/2002 |
| IE | 20040230 A1 * | 12/2004 |
| JP | 2001 071 730 A | 3/2001 |
| WO | WO 2005/0 01 308 A1 | 1/2005 |

* cited by examiner

WHEEL SUSPENSION FOR MOTOR VEHICLES

CROSS-REFERENCES TO RELATED APPLICATIONS

This application is the U.S. National Stage of International Application No. PCT/EP2010/006256, filed Oct. 13, 2010, which designated the United States and has been published as International Publication No. WO 2011/050911 and which claims the priority of German Patent Application, Serial No. 10 2009 051 468.6, filed Oct. 30, 2009, pursuant to 35 U.S.C. 119(a)-(d).

BACKGROUND OF THE INVENTION

The invention relates to a wheel suspension for motor vehicles.

Wheel suspensions of this type are known in many manufactured structures, wherein front wheel suspensions and rear wheels suspensions are typically designed differently and articulated on the body or on a suitably adapted auxiliary frame. In addition to elastokinematic measures for improving, in particular, the driving-dynamic requirements, mechatronic components are increasingly used which allow the level of the vehicle to be adjusted, which counteract tilt and roll, which correct camber and toe values depending on the driving-dynamic parameters, etc.

It is an object of the invention to propose a wheel suspension of the generic type, which can be employed for the front and rear wheel axles of a vehicle type using many identical parts and which can be designed with advantageous kinematic properties for specific applications.

This object is attained according to the invention with a wheel suspension for a motor vehicle with an auxiliary frame designed as an independent modular frame for each wheel suspension and connected, on one hand, to the body of the motor vehicle and, on the other hand, to a wheel carrier.

SUMMARY OF THE INVENTION

According to the invention, it is proposed that the auxiliary frame is constructed as an individual modular frame for each wheel suspension, on which the at least one wheel guide element is indirectly or preferably directly articulated, on which the suspension and damping system is indirectly or directly and at least partially, meaning for the most part, supported, and on which at least one actuator for actuating the suspension and damping system and/or the steering system and hence for adjusting a predetermined wheel-specific wheel guide and/or control arm parameters are indirectly or directly arranged. The at least one actuator is preferably a mechatronic component or an electromotor actuator, respectively, which controls, for example in steer-by-wire system, tracking and steering, thereby preventing self-steering movements through coupling with the second wheel of the axle; advantageously, this applies also to wheel guide elements that are not, as is the case with a common auxiliary frame, influenced by the respective other vehicle side through interfering torques, lateral forces etc. With the steering actuator, a steering movement of the front wheel suspension of, for example, 35° steering angle and with a rear wheel suspension of, for example, 10° steering angle can be steered in the same direction or in opposite directions, wherein such steering may be performed with a central electronic control device in feedback mode; moreover, any steering corrections during unstable driving conditions, during deceleration or acceleration, etc., can be controlled. The individual modular frame can also be readily installed in the motor vehicle and has overall less weight than a continuous auxiliary frame which receives both wheel suspensions.

In a particularly advantageous embodiment of the invention, an adjustment spring connected in parallel with a bearing spring and having a spring pretension that can be changed by an actuator may be associated with the suspension system. With this design, level adjustment and more particularly tilt and roll compensation may be implemented with the adjustment spring by applying small adjustment forces; a transverse stabilizer which is typical for wheel suspensions may thus be eliminated.

The modular frame may preferably be mounted on the body with several passive or active, preferably rubber-elastic, decoupling elements, in particular rubber-metal bearings, wherein the decoupling elements are designed to be softer in the longitudinal direction of the vehicle than in the vertical direction and in the transverse direction. This creates a defined longitudinal suspension with increased rolling comfort of the wheel suspension, whereby the individual suspension prevents self-steering of the wheel suspension.

In addition, the modular frame may be connected with the body by two lower and one upper passive or active, preferably rubber-elastic decoupling element, in particular a rubber-metal bearing, wherein the decoupling elements form preferably essentially an isosceles triangle with stable support basis for wheel guidance of the wheel suspension in an easily mountable arrangement.

In a particularly advantageous embodiment, the modular frame with the wheel guide elements may be constructed symmetrically such that the modular frame can be installed in any manner on the vehicle, for example with identical axle characteristic data, such as toe, and for an identical wheelbase laterally inverted on the left side or the right side of the motor vehicle. This means that an at least substantially uniform modular frame with wheel guide elements, suspension and damping system and tracking control arm with control arm actuator can be used. Because the control arms are not mechanically connected by a conventional steering gear, it must only be paid attention for steering that the control arm is articulated, for example, on the right rear side and the left front side on the control arm of the respective wheel carrier. However, several identical parts may be eliminated by using an identical mirror-symmetric wheel carrier, so that both control arms may be positioned behind or in front of the steering axle of the wheel carriers by using a corresponding different arrangement of the control arm with control arm actuator on the modular frame (second mirror-symmetric mounting location).

For attaining a low weight and structural stability, the modular frame may include an outer frame and intermediate braces and may be made from a light metal by a casting or forging process.

When viewed from the top, the lower and/or the upper wheel guide element may preferably be symmetric transverse control arms with a pivot axis oriented essentially horizontally and parallel to the longitudinal center axis of the motor vehicle, wherein the steering axle formed through articulation of the wheel carrier on the transverse control arms via ball joints also extends substantially vertically. In the basic design (construction position), identical axle parameters can be attained with a simple structure on the front and rear wheel suspensions.

In addition, it is proposed that the upper transverse control arm is articulated on the modular frame via an additional electromotor actuator and adjustable for adjusting the camber and/or optionally the caster. With this measure, the uniform wheel suspension can be readily adapted after installation to different driving dynamic requirements of the front and rear wheel suspension; for example, when driving through curves, the lateral guidance of the rear wheel on the outside of the curve can be increased by adjusting the camber.

In an advantageous embodiment of the invention, the bearing spring of the suspension system may be formed by at least one torsion rod and the damping system by a rotation damper, wherein at least the rotation damper is arranged coaxially with respect to the pivot axis of the transverse control arm facing the body. This results in a particularly tight, robust spatial structure of the described component with a low center of gravity. The torsion bar which is also arranged coaxially with respect to the pivot axis of the lower transverse control arm may here preferably be drivingly coupled with the transverse control arm, passing through the rotation damper.

For obtaining an active wheel suspension with driving-dynamic and load-dependent level adjustment and for active tilt and roll compensation of the motor vehicle, at least one additional torsion bar may operate on the lower transverse control arm as a storage spring, wherein the spring pretension of the storage spring may be adjustable via a rotation actuator that can be adjusted with an electric motor. The additional torsion bar connected in parallel with the bearing spring may be used, for example, to change the loading of the bearing spring.

The additional torsion bar may be formed to provide a structural and spatial advantage by two interpenetrating telescopic and serially cooperating torsion springs, which are drivingly connected with each other and, on one hand, with the rotation actuator and, on the other, with the transverse control arm, and which may advantageously be arranged or supported on the modular frame. In a preferred arrangement, as viewed in a top view, the rotation damper and the first torsion bar may be arranged on one side of the transverse control arm, while the rotation actuator and the other torsion bar may be arranged on the other side of the transverse control arm.

In an alternative embodiment of the invention, the suspension system may have a coil compression spring which is supported, on one hand, on the modular frame and, on the other hand, on the wheel guide elements. The coil compression spring configured as a bearing spring may then advantageously be structurally combined with the aforementioned additional torsion bar as a storage element.

Moreover, the suspension and damping system may be formed by a suspension strut with a coil compression spring and a telescopic shock absorber which are supported and articulated on an upper cantilever beam of the modular frame. The cantilever beam may be formed directly on the modular frame.

The suspension strut may be articulated on the aforementioned upper transverse control arm or preferably rigidly connected directly with the wheel carrier without the upper transverse control arm.

Lastly, when the wheels of the motor vehicle are driven via Cardan shafts, the disk brakes of the service brake may be arranged in the flux of force from the Cardan shafts and outside the wheel suspension, so that the brake and drive torques acting on the wheel carriers are directly supported on the drive assembly of the motor vehicle.

BRIEF DESCRIPTION OF THE DRAWING

Two exemplary embodiments of the invention will now be described in more detail. The schematic drawing shows in.

DETAILED DESCRIPTION OF PREFERRED EMBODIMENTS

Figure 1:
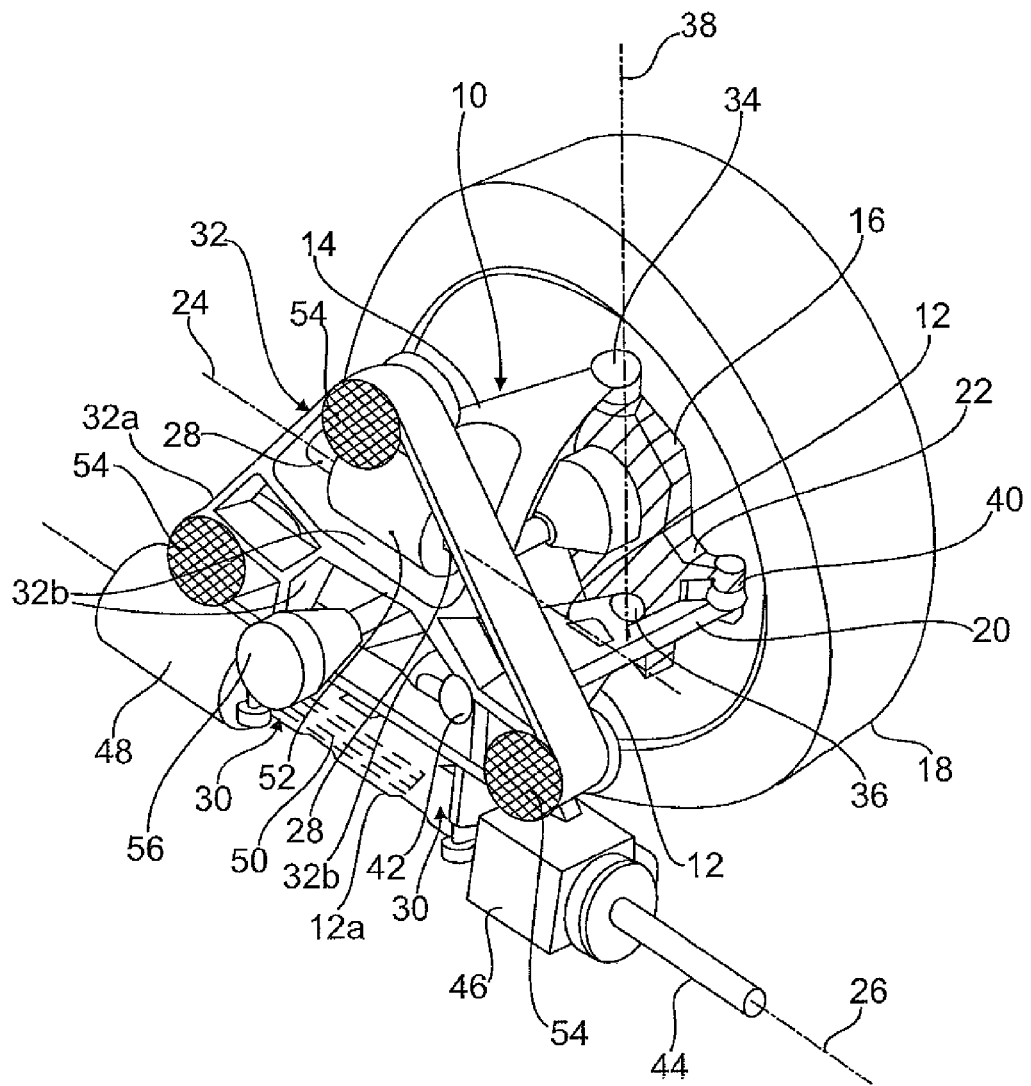
FIG. 1 in a three-dimensional diagram, a wheel suspension for motor vehicles with an upper and a lower transverse control arm which are articulated on a modular frame, as well as with a rotation damper, a rotation actuator, a torsion bar as bearing spring, and a control arm actuator, FIG. 2 the wheel suspension of FIG. 1 without a modular frame for a better visualization of the actuators, FIG. 3 an equivalent functional diagram of the suspension and damping system of the wheel suspension according to FIGS. 1 and 2, FIG. 4 an alternative embodiment of a wheel suspension with a uniformly usable modular frame as viewed in the driving direction of the motor vehicle, with a suspension strut as suspension and damping system, and FIG. 5 the alternative wheel suspension of FIG. 4 in a transverse view indicated by the arrow X in FIG. 4.
Figure 2:
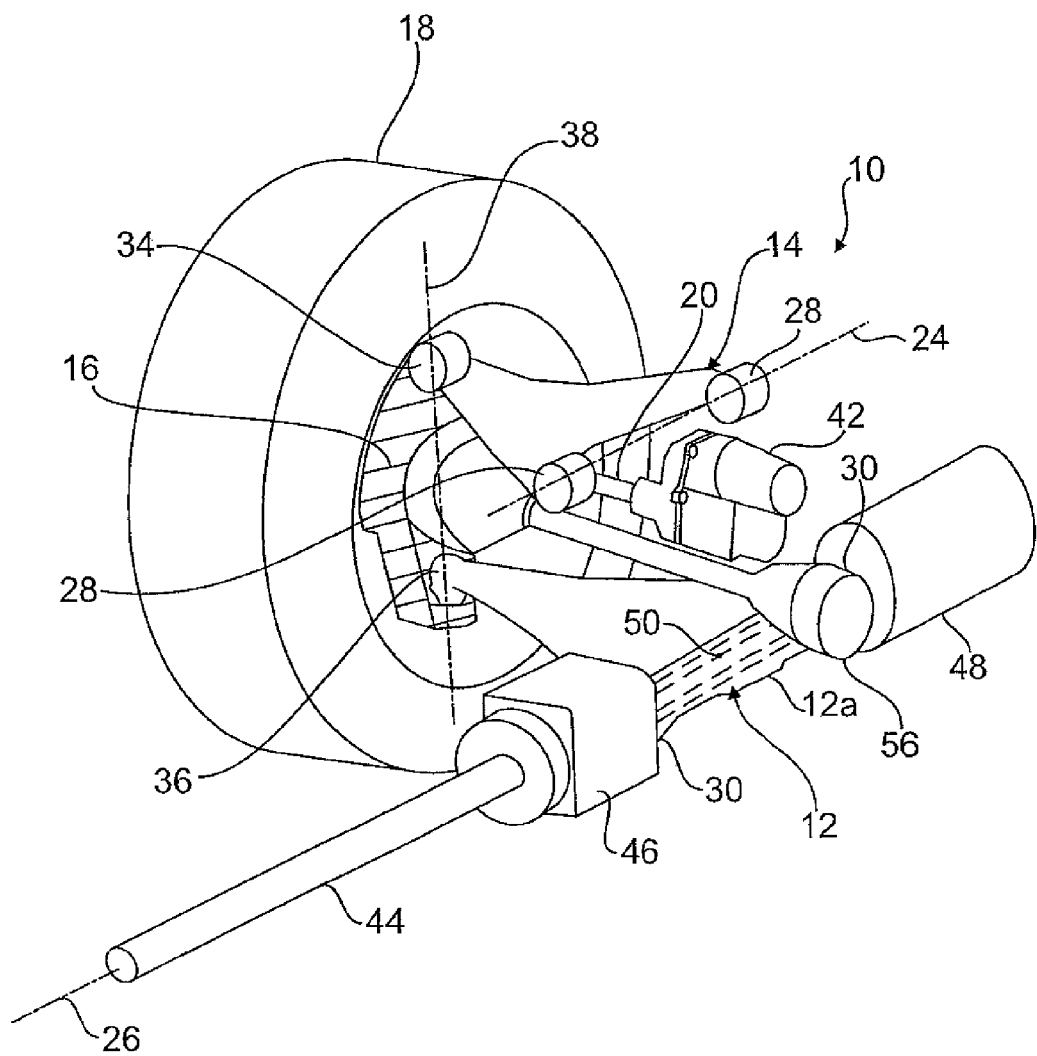

FIGS. 1 and 2 show two different views of a wheel suspension 10 for motor vehicles, which can be used on the front axle and on the rear axle, either on the left side or on the right side.

The wheel suspension 10 is substantially constructed from a lower transverse control arm 12, an upper transverse control arm 14, a wheel carrier 16 for a rotatably supported wheel 18, and a third control arm 20 which is articulated on a control arm 22 of the wheel carrier 16.

The two transverse control arms 12, 14 are each articulated on a modular frame 32 about a corresponding horizontal pivot axis 24, 26 oriented parallel to the longitudinal axis of the vehicle by way of two bearing locations 28, 30. The transverse control arms 12, 14 are connected on the side of the wheel carriers with the wheel carrier 16 by ball joints 34, 36, forming a vertical steering axis 38. The transverse control arms 12, 14 are constructed symmetrically so that the axle parameters, such as wheel base or camber, do not change when the wheel suspension 10 with the modular frame 32 is mounted.

The third control arm 20 (also referred to as tie rod) is articulated via an additional ball joints 40 on the control arm 22 in a space outside this steering axis 38 and is also connected in an articulated manner with the control arm actuator 42 (see in particular FIG. 2), which is in turn screwed together with the modular frame 32 or directly integrated in the modular frame 32.

The length of the third control arm 20 can be adjusted with the control arm actuator 42 with an electric motor for controlling a steering movement of the wheel 18 or for correcting toe.

The lower transverse control arm 12 is directly drivingly connected with a torsion bar 44 (only partially visible) arranged coaxially with the pivot axis 26 of the control arm 12. The torsion bar 44 operates as bearing spring and is (not shown) fixedly connected with the body of the motor vehicle. The connections may be implemented, for example, as notch-plug toothing.

The torsion bar 44 passes through the rotation damper 46 which is also arranged coaxially with the pivot axis 26 and directly adjacent to the transverse control arm 12 and which operates as a shock absorber. The housing of the rotation damper 46 is screwed together with the modular frame 32 and the rotor parts (not visible) of the rotation damper 46 are drivingly fixedly connected with the transverse control arm 12.

A rotation actuator 48 is provided on the opposite side of the transverse control arm 12 coaxially with its pivot axis 26, wherein the housing of the rotation actuator 48 is in turn screwed together with the modular frame 32 and the rotor parts (not visible) are drivingly connected via a second torsion bar 50—shown only by dashed lines—with the lower control arm 12.

The torsion bar 50 is here arranged inside a tubular section 12a of the transverse control arm 12 and is constructed of two telescoping torsion springs made of, for example, titanium, which are fixedly connected with each other inside the tubular section 12a, whereas their free ends are drivingly connected with the rotation actuator 48 and the transverse control arm 12, respectively.

The pretension of the second torsion bar 50 can be varied by the rotation actuator 48 for changing the spring rate of the first torsion bar employed as a bearing spring, for example for level adjustment of the chassis of the motor vehicle, for compensation of roll and pitch, etc.

An additional electromotor-operated actuator 52 is mounted on the modular frame 32 in the region of the pivot axis 24 of the upper transverse control arm 14 for adjusting the steering axis 38 of the wheel 18 for controlling camber and/or caster, etc. The actuator 52 forms at the same time the bearing locations 28 of the upper transverse control arm 14. The bearing locations 28, which may optionally be constructed as adjustable eccentric members, may be adjusted relative to the modular frame 32 (not shown) by suitable control of the actuator 52.

The modular frame 32 is screwed to the body of the motor vehicle by three rubber-metal bearings (not illustrated) inserted in integrally formed bearing bushes 54. The rubber metal bearings hereby form an isosceles triangle, so that the modular frame can be mounted laterally inverted in the vertical direction on the left side and the right side. The rubber-metal bearing 54 is hereby designed to be harder in the transverse direction of the vehicle and in the vertical direction than in the longitudinal direction of the vehicle, so as to ensure a comfortable longitudinal spring action of the wheel suspension 10.

As seen in FIG. 1, the modular frame 32 is constructed as a framework, with a continuous outer frame 32 and intermediate reinforcing braces 32b. The modular frame 32 is lightweight and manufactured as a light-metal forged part.

In addition, the bearing locations 28, 34 of the upper transverse control arm 14, the bearing locations 30, 36 of the lower transverse control arm 12 and the articulated joint 36 on the control arm 20 with the articulated joint on the control rod actuator 42, which is not shown in detail, are constructed substantially inelastic (i.e., not intentionally elastic) so as to enable the actuators 42, 46, 48, 52 to precisely control wheel guidance and wheel positions. The bearing locations 30 of the transverse control arm 12 may also be arranged directly in the actuators 46, 48 instead of on the modular frame 32.

The wheel 18 is connected with a Cardan shaft 56 which is drivingly connected with the drive assembly of the motor vehicle, wherein the unillustrated disk brake of the wheel 18 is positioned in the flux of force before the Cardan shaft 56, i.e. directly on the respective output of the drive assembly.

The wheel suspension 10 illustrated in FIG. 1 with the modular frame 32 forms a pre-installation unit which can be used in an all-wheel motor vehicle with four-wheel steering on the front axle (front wheel suspensions 10) and on the rear axle (rear wheel suspensions 10). The left-hand and right-hand components may be identical due to the symmetric construction of the components.

The rotation damper 46 is preferably constructed as a generator, so that the damping energy to be generated can be returned as electric energy to the onboard network of the motor vehicle in recuperation mode. However, the rotation damper 48 may, in combination or solely, also be constructed as a hydraulic damper, optionally with an electro-rheological damping fluid for adjusting the damping effect.

The rotation actuator 48 may also be switched as a generator, in addition to the electromotor-controlled change of the pretension of the second torsion bar 50, to optionally provide additional damping in recuperation mode and/or to store recovered energy.

Figure 3:
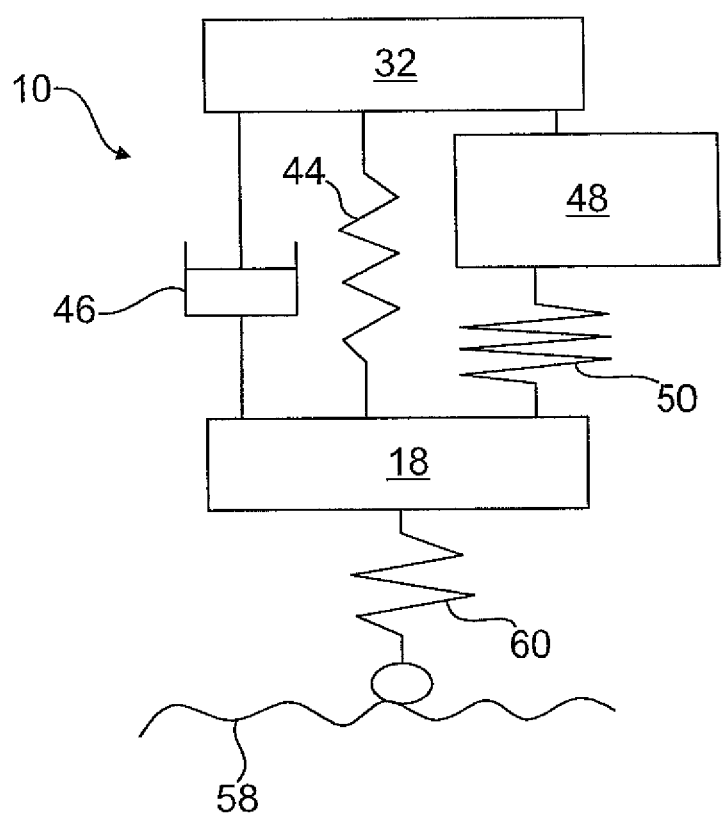

FIG. 3 shows the schematic diagram of the suspension and damping device of the wheel suspension 10 illustrated in FIGS. 1 and 2. Functionally identical parts have identical reference symbols.

As can be seen, the torsion bar 44 as a bearing spring and the adjustment spring and/or the second torsion bar 50 are arranged in parallel between the modular frame 32 and the wheel 18, wherein the pretension may be superimposed on the second torsion bar 50 with the rotation actuator 48 for level adjustment and for tilt and roll compensation of the motor vehicle, commensurate with the first torsion bar 44. The springs 44, 50 are shown as coil compression springs for sake of simplicity.

The likewise parallel-connected rotation damper 46 (again shown in a simplified diagram) operates in a conventional manner for damping the body oscillations excited by the unevenness of the road surface 58 and by the elasticity factor 60 of the tire of the wheel 18. As described above, the rotation actuator 48 may optionally also produce a defined damping effect.

For adjusting the axle-specific parameters, such as toe, camber, construction level (level height) of the wheel suspension 10, the actuators 48, 52 and the control rod actuator 42 are suitably controlled by a central electronic control device (not illustrated) in feedback mode. The basic setting is set on a suspension test station, in which the axle parameters and the wheel positions are measured and the corresponding basic adjustments are made and stored.

When driving the motor vehicle, these basic settings can be changed and dynamically and/or statically adapted, commensurate with driving-dynamic parameters, load and driving-stability-related criteria.

Figure 4:
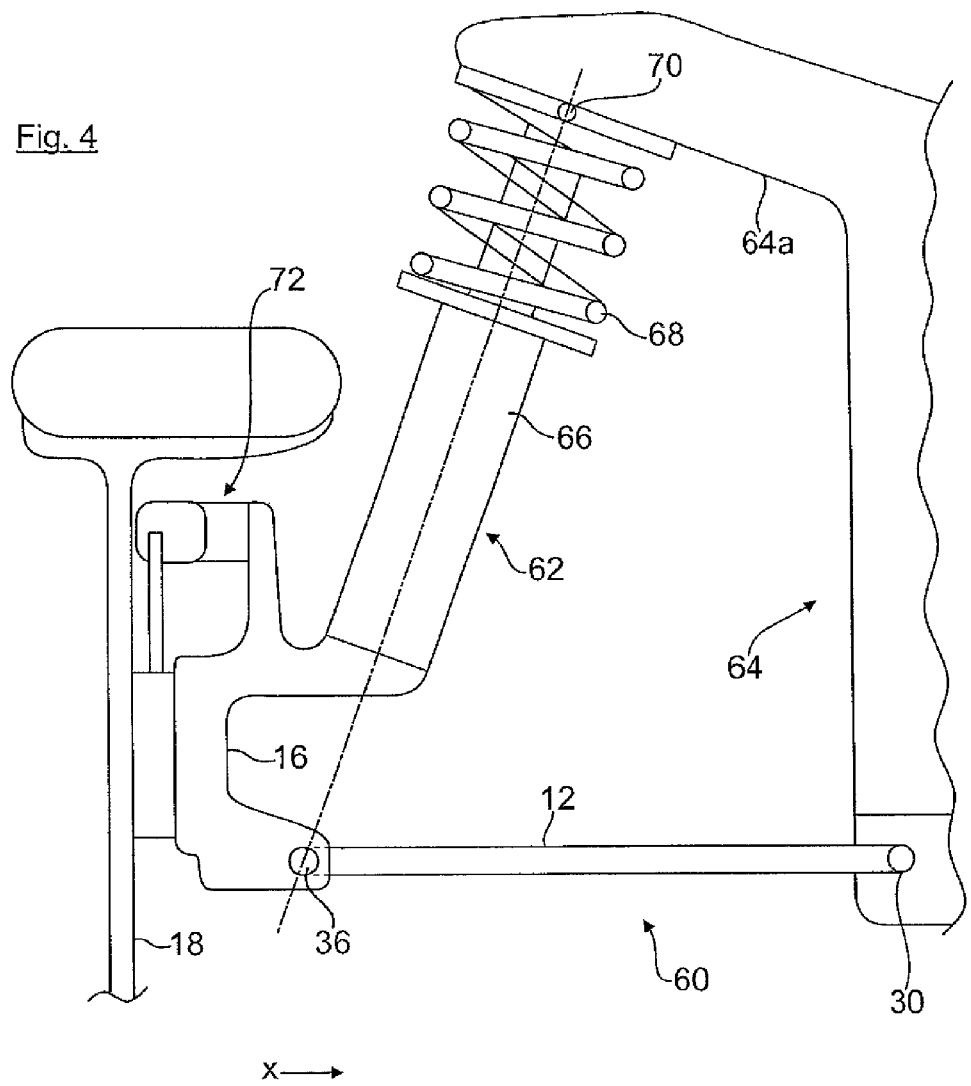
Figure 5:
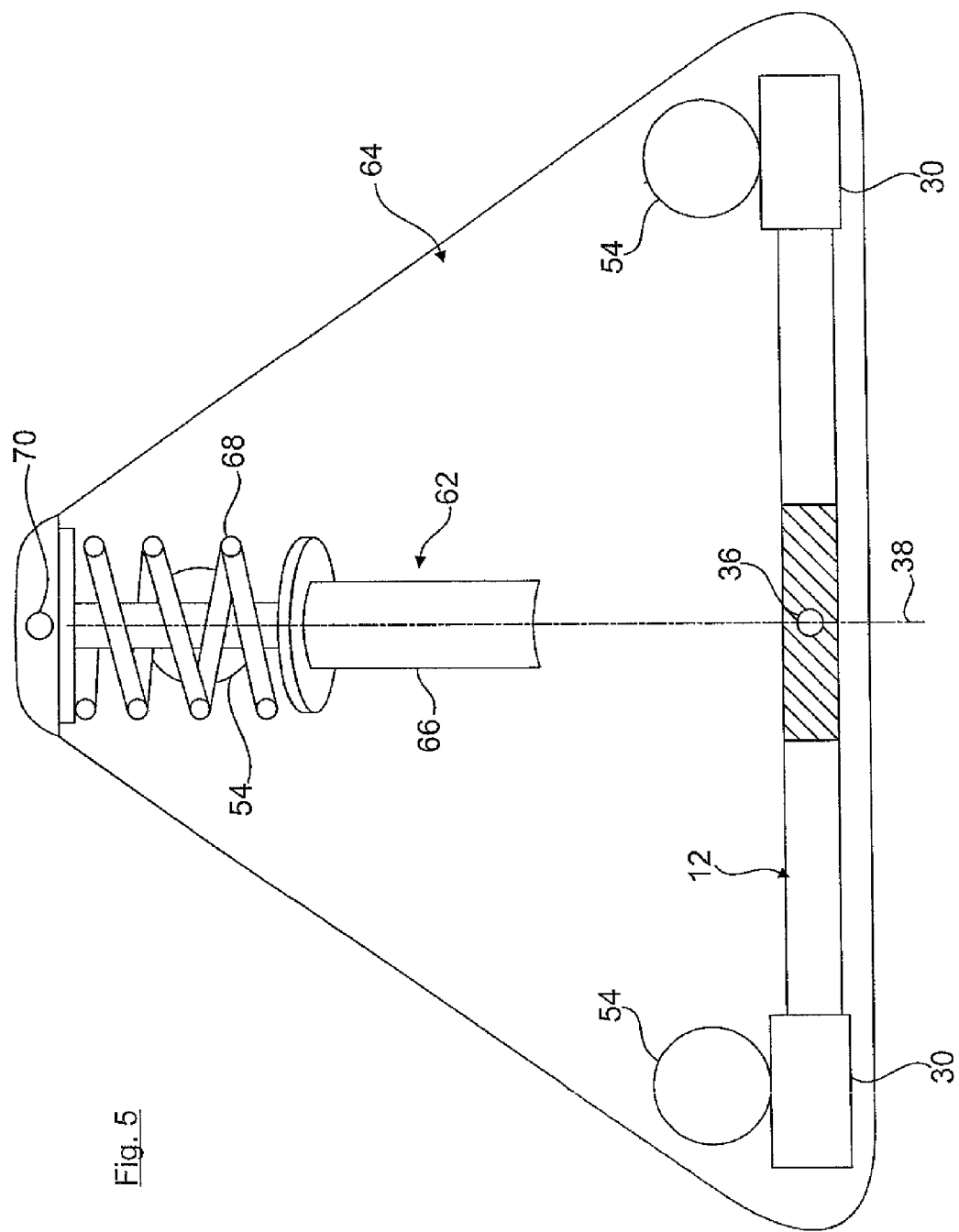

FIGS. 4 and 5 show an alternative embodiment of the invention, which is only illustrated only to the extent to which it is substantially different from the embodiments of FIGS. 1 and 2. Functionally identical parts have identical reference symbols.

Unlike the aforedescribed wheel suspension, the suspension and damping system with the wheel suspension 60 according to FIGS. 4 and 5 is formed by a suspension strut 62 which is, on one hand, fixedly connected with the wheel carrier 16 and, on the other hand, supported in an articulated manner on a cantilever beam 64a of the modular frame 64 via an (merely suggested) damping bearing 70. The cantilever beam 64a is integrally formed on the modular frame 64.

The suspension strut includes a telescopic shock absorber 66 and a coil compression springs 68 acting as a bearing spring. The steering axis 38 of the wheel carrier 16 or of the wheel 18, respectively, extends in the illustrated side view (FIG. 4) inwardly at an angle from the bottom to the top, whereas the steering axis 38 extends vertically in the transverse view (FIG. 5), so that the wheel suspension 60 with the modular frame 64 can be mounted on the left side and the right side of the motor vehicle.

It should be mentioned that the only partially illustrated wheel suspension 60, unless described otherwise, is constructed similar to the wheel suspension 10, i.e. with the corresponding control rod actuator 42, wherein the tracking control arm 20 of the control rod actuator 42 is articulated on the wheel carrier 16, and with the similarly constructed symmetric modular frame 32.

As described above, the torsion bar 50 on the lower transverse control arm 12 may be provided as an adjustment spring with the rotation actuator 48 so as to provide an active wheel suspension with level adjustment and tilt and roll compensation.

Moreover, when the aforedescribed suspension strut 62 is employed, the service brake or disk brake 72 of the motor vehicle may also be arranged on the wheel carrier 16 in a conventional manner, so that the induced brake moments are supported by the suspension strut.

Unlike the embodiment of the wheel suspension 60 according to FIGS. 4 and 5, both transverse control arms 12 and 14 may be provided, wherein the suspension strut 62 is then articulated on the upper or on the lower transverse control arm 12, 14. Like in FIGS. 1 and 2, the steering axis 38 is then formed by the outer ball joints 34, 36 and can be adjusted accordingly via the actuator 52 for setting a different wheel camber.

What is claimed is:

1. A wheel suspension for a motor vehicle, comprising:
an auxiliary frame designed as an independent modular frame for the wheel suspension and connected, on one hand, to the body of the motor vehicle and, on the other hand, to a wheel carrier,
a suspension and damping system at least partially directly or indirectly supported on the modular frame,
a steering system for a wheel,
at least one wheel guide element indirectly or directly articulated both to the modular frame and to the wheel carrier,
at least one actuator directly or indirectly arranged on the modular frame for actuating at least one of the suspension and damping system and the steering system to set predetermined wheel-specific wheel guidance and/or steering parameters, and
a plurality of passive or active decoupling elements connecting the modular frame to the body, said decoupling elements being constructed to be softer in a longitudinal direction of the motor vehicle than in a vertical direction and a transverse direction.

2. The wheel suspension of claim 1, wherein the decoupling elements are rubber-elastic elements.

3. The wheel suspension of claim 1 wherein the decoupling elements are rubber-metal bearings.

4. The wheel suspension of claim 1, wherein the modular frame is connected with the body by two lower and one upper passive or active decoupling elements.

5. The wheel suspension of claim 4, wherein two lower and one upper decoupling elements form a substantially isosceles triangle.

6. The wheel suspension of claim 1, wherein the modular frame with the wheel guide elements is constructed symmetrically such that the modular frame is configured for installation in at least one of the following situations:
with identical characteristic axle data and identical wheelbase value,
in a laterally inverted way on the left side and the right side of the motor vehicle,
on a side of the front axle, and
on a side of the rear axle.

7. The wheel suspension of claim 1, wherein the modular frame is constructed in form of a framework structure with an outside frame and intermediate braces.

8. The wheel suspension of claim 1, wherein the modular frame is constructed from light metal by a casting or forging process.

9. The wheel suspension of claim 1, wherein the wheel carrier is configured for articulation on an upper and lower control arm formed by an upper and a lower of the at least one wheel guide element by way of ball joints, said articulation defining a substantially vertical steering axle.

10. A wheel suspension for a motor vehicle, comprising:
an auxiliary frame designed as an independent modular frame for the wheel suspension and connected, on one hand, to the body of the motor vehicle and, on the other hand, to a wheel carrier,
a suspension and damping system at least partially directly or indirectly supported on the modular frame,
a steering system for a wheel,
at least one wheel guide element indirectly or directly articulated both to the modular frame and to the wheel carrier, the at least one wheel guide element comprising an upper wheel guide element constructed as an upper transverse control arm which is articulated on the modular frame by an electric-motor-driven actuator and adjustable for variable setting of wheel guide parameters selected from wheel camber and caster, wherein a pivot axis of the upper transverse control arm is oriented substantially horizontally and parallel to the longitudinal center axis of the motor vehicle, and
at least one actuator directly or indirectly arranged on the modular frame for actuating at least one of the suspension and damping system and the steering system to set predetermined wheel-specific wheel guidance and/or steering parameters.

11. The wheel suspension of claim 10, wherein the upper transverse control arm is symmetric, when viewed in a top view.

12. The wheel suspension of claim 10, further comprising a control arm actuator arranged on the modular frame for adjusting a control arm.

13. The wheel suspension of claim 12, wherein the control arm actuator is integrated in the modular frame.

14. The wheel suspension of claim 10, wherein the suspension and damping system comprises a bearing spring and a parallel-connected adjustment spring having a changeable spring pretension that is adjustable by the at least one actuator.

15. The wheel suspension of claim 10, wherein the suspension and damping system comprises a coil compression spring which is supported, on one hand, on the modular frame and, on the other hand, on the wheel guide elements.

16. The wheel suspension of claim 15, wherein the suspension and damping system is formed by a suspension strut having the coil compression spring and a telescopic shock absorber, with the suspension strut supported and articulated on an upper cantilever beam of the modular frame.

17. The wheel suspension of claim 16, wherein the suspension strut is rigidly connected directly with the wheel carrier in absence of the upper transverse control arm.

18. The wheel suspension of claim 16, wherein the wheel of the motor vehicle is driven by way of Cardan shafts, and disk brakes of a service brake are arranged in a flux of force upstream of the Cardan shafts and outside the wheel suspension.

19. A wheel suspension for a motor vehicle comprising:
an auxiliary frame designed as an independent modular frame for the wheel suspension and connected, on one hand, to the body of the motor vehicle and, on the other hand, to a wheel carrier, a suspension and damping system at least partially directly or indirectly supported on the modular frame, a steering system for a wheel, at least one wheel guide element indirectly or directly articulated both to the modular frame and to the wheel carrier, the at least one wheel guide element comprising a lower wheel guide element constructed as a lower transverse control arm, wherein a pivot axis of the lower transverse control arm is oriented substantially horizontally and parallel to the longitudinal center axis of the motor vehicle, at least one actuator directly or indirectly arranged on the modular frame for actuating at least one of the suspension and damping system and the steering system to set predetermined wheel-specific wheel guidance and/or steering parameters, and at least one torsion bar forming a bearing spring of the suspension system and a rotation damper arranged coaxially with respect to the pivot axis of a lower transverse control arm forming the damping system.

20. The wheel suspension of claim 19, wherein the lower transverse control arm is symmetric, when viewed in a top view.

21. The wheel suspension of claim 19, wherein the torsion bar which extends coaxially with the pivot axis of the lower transverse control arm is drivingly coupled with the lower transverse control arm, passing through the rotation damper.

22. The wheel suspension of claim 19, further comprising at least one additional torsion bar engaging on the lower transverse control arm and forming an adjustment spring having an adjustable spring pretension that is adjustable with the at least one actuator which is constructed as an electric-motor-driven rotary actuator.

23. The wheel suspension of claim 22, wherein the additional torsion bar is formed by two telescoping, serially cooperating torsion springs, which are drivingly connected with one another and, on one hand, with the rotary actuator and, on the other hand, with the lower transverse control arm.

24. The wheel suspension of claim 22, wherein, as viewed in a top view, the rotation damper and a first torsion bar are arranged on one side of the lower transverse control arm, whereas the rotary actuator and an additional torsion bar are arranged on another side of the transverse control arm.

* * * * *